US008176533B1

(12) United States Patent
Violleau et al.

(10) Patent No.: US 8,176,533 B1
(45) Date of Patent: May 8, 2012

(54) COMPLEMENTARY CLIENT AND USER AUTHENTICATION SCHEME

(75) Inventors: Thierry P. Violleau, Poissy (FR); Tanjore Ravishankar, San Jose, CA (US); Matthew R. Hill, San Jose, CA (US); Sebastian J. Hans, Berlin (DE)

(73) Assignee: Oracle America, Inc., Redwood City, CA (US)

( * ) Notice: Subject to any disclaimer, the term of this patent is extended or adjusted under 35 U.S.C. 154(b) by 1356 days.

(21) Appl. No.: 11/593,679

(22) Filed: Nov. 6, 2006

(51) Int. Cl.
*H04L 29/06* (2006.01)
(52) U.S. Cl. .............. 726/5; 713/189; 705/62; 340/5.81
(58) Field of Classification Search ................ 726/5, 27; 340/5.81; 705/62; 713/186
See application file for complete search history.

(56) References Cited

U.S. PATENT DOCUMENTS

| 6,311,272 | B1* | 10/2001 | Gressel .................... 713/186 |
| 2002/0174224 | A1 | 11/2002 | Scheifler et al. |
| 2004/0088562 | A1 | 5/2004 | Vassilev et al. |
| 2004/0199787 | A1* | 10/2004 | Hans et al. .................... 726/27 |
| 2004/0216150 | A1 | 10/2004 | Scheifler et al. |
| 2005/0197967 | A1* | 9/2005 | Booth et al. ............... 705/62 |
| 2007/0024422 | A1* | 2/2007 | Doyen .................... 340/5.81 |

FOREIGN PATENT DOCUMENTS

| EP | 1 431 862 A2 | 6/2004 |
| WO | WO 2005/045735 A1 | 5/2005 |

OTHER PUBLICATIONS

Gong, L. et al., "Implementing Protection Domains in the Java™ Development Kit 1.2", Proceedings of the Internet Society Symposium on Network and Distributed System Security, XP-002304112, Mar. 1988, 10 pages.
Gong, L. et al., "Going Beyond the Sandbox: An Overview of the New Security Architecture in the Java™ Development Kit 1.2", Proceedings of the Usenix Symposium on Internet Technologies and Systems, XP-002250254, Dec. 1997, 10 pages.
Gong, L. et al., "Java Security Architecture (JDK 1.2)", Internet Citation, XP-002171445, dated Dec. 6, 1998, 62 pages.
European Patent Office, "European Search Report", European application No. 07250044.0-2212, received Nov. 30, 2007, 10 pages.
Claims, European application No. 07250044.0-2212, 5 pages.

(Continued)

*Primary Examiner* — Vivek Srivastava
*Assistant Examiner* — Thong Truong
(74) *Attorney, Agent, or Firm* — Osha • Liang LLP

(57) ABSTRACT

An authentication mechanism is provided to authenticate both client and user of a portable computing device when the user causes a client to request a protected resource on the portable computing device. Upon receiving a request a protected resource by the client, the authentication mechanism determines which authentication method is specified for authentication of the client, and authenticates the client accordingly. Upon a determination that the client is authentic, the authentication mechanism invokes a user interface that is separate and distinct from the client to solicit input from the user. Based on the input solicited from the user, the authentication mechanism determines whether the user is an authentic user of the portable computing device. If it is determined that the user is an authentic user, the authentication mechanism determines based on an indication from the user whether the client should be authorized to access the protected resource requested.

18 Claims, 3 Drawing Sheets

OTHER PUBLICATIONS

European Patent Office, "European Search Report", European application No. 06256576.7-2212, received Jan. 3, 2008, 11 pages.

Claims, European application No. 06256576.7-2212, 5 pages.

Nagaratnam, Nataraj et al., "Practical delegation for secure distributed object environments", Distributed Systems Engineering, Institute of Physics Publishing, Bristol, Great Britain, vol. 5, No. 4, XP-020073372, Dec. 1, 1998, 12 pages.

Wangham, Michelles et al., "Security Mechanisms for Mobile Agent Platforms Based on SPKI/SDSI Chains of Trust", Software Engineering for Multi-Agent Systems II Lecture Notes in Computer Science, Springer-Verlag, Berlin, vol. 2940, XP-019003515, 2004, 18 pages.

Molva, Refik et al., "A Distributed Access Control Model for Java", Computer Security, Esorics 2000 Lecture, Notes in Computer Science, Springer-Verlag, 2000, Heidelberg, Berlin, XP-019049349, vol. 1895, 18 pages.

\* cited by examiner

COMPLEMENTARY CLIENT AND USER AUTHENTICATION SCHEME

This application is related to U.S. patent application Ser. No. 11/507,872, entitled "METHOD AND APPARATUS FOR PROTECTION DOMAIN BASED SECURITY", filed by THIERRY VIOLLEAU et al. on Aug. 21, 2006, the entire contents of which is hereby incorporated by reference for all purposes as if fully set forth herein.

This application is related to U.S. patent application Ser. No. 11/511,948, entitled "METHOD AND APPARATUS FOR DATA TRANSFER BETWEEN ISOLATED EXECUTION CONTEXTS", filed by THIERRY VIOLLEAU et al. on Aug. 28, 2006, the entire contents of which is hereby incorporated by reference for all purposes as if fully set forth herein.

BACKGROUND

Portable computing devices such as smart cards can be used by users for various traditional purposes such as shopping at a grocery store, or gaining entry to a secured building. As they become more powerful than before in terms of computing power and memory capacity, the portable computing devices can be used for more expansive purposes. For example, a portable computing device may be equipped with a web server capable of processing requests from remote clients using HyperText Transfer Protocol (HTTP). Through the web server, the portable computing device may interact with a variety of clients including ones enabling payment for online shopping. Such a client may be an HTTP client application located in an American Express™ machine somewhere on a network to which both the portable computing device and the American Express™ machine are connected.

A disadvantage of the remote processing techniques is that they typically only authenticate clients. An unauthorized user can use a stolen portable computing device and deliberately cause it to interact with a trusted remote client. In that interaction, the remote client would be able to present correct credential information for itself along with a request for accessing a protected resource on the portable computing device. The remote processing functionality on the portable computing device would successfully authenticate and authorize the remote client. As a result, the unauthorized user can successfully use the trusted remote client to gain access to, and tamper with, the protected resource on the portable computing device.

Therefore, since the existing techniques are not as useful in preventing an unauthorized user from gaining access to protected resources on a portable computing device through a trusted remote client, an improved scheme which would enable such prevention is needed.

SUMMARY

In accordance with one embodiment of the present invention, there is provided an authentication mechanism that authenticates both a client and a user after the user causes the client to make a request for a protected resource on a portable computing device presumably owned by the user. As used herein, the term "protected resource" refers to data, methods, and/or objects on a portable computing device, or in software or hardware modules thereon, that only trusted clients may access with authorization from an authenticated user. An example of a protected resource might be a cash value stored on a portable computing device. The term "protected resource" may also mean a protected functionality. That is, a protected resource does not have to be a "static" resource whose access is mediated by a server application, but also may be certain or all functionalities of the server application itself. Trusted clients here may include authenticated clients such as an online store that can present correct credential information when required. In the example involving the online store, the portable computing device's cash value might be accessed or changed by the online store with which a purchase could be made, and such access of the portable computing device's cash value, in accordance with one embodiment of the present invention, must be authorized by an authentic user of the portable computing device. The term "access" here refers to operations such as reading, writing, creating, deleting, modifying, executing, etc, and such an operation on a protected resource may be directly performed by an authenticated client or indirectly performed through a software or hardware module such as a server application on the portable computing device. The word "presumably" in the above phrase "presumably owned by the user" means that, while the user who causes the client to request access to a protected resource on a portable computing device presumably own the portable computing device, the user might not be an authorized user (e.g., might be an imposter or a thief) and would be prevented from authorizing a client to access the protected resource until and unless the user could pass a related authentication challenge.

In one embodiment, a remote access server is provided on the portable computing device. The portable computing device may be connected to a network such as the global internet. A client of the portable computing device may be located anywhere on the network. To access a protected resource for a designated purpose, the client can communicate with a server application on the portable computing device that is associated with the protected resource. In one embodiment, this communication is mediated by the remote access server on the portable computing device.

In one embodiment, the authentication mechanism implements authentication for all clients in a server application container; thus, the server applications do not need to implement their own authentication mechanisms. To prevent unauthorized access to a protected resource, before a request from a client is routed to and handled by a corresponding server application, the authentication mechanism in the server application container authenticates the client on behalf of the server application.

In one embodiment, a deployment descriptor is used to associate each one of protected resources with (i) a server application and (ii) a client authentication method that is used to authenticate clients who request the associated protected resource. Thus, upon receiving a request for a protected resource by a client that has not been authenticated, the authentication mechanism in the server application container, based on the deployment descriptor, identifies the protected resource, determines which server application is responsible for processing the request and which authentication method is specified for authenticating clients who request the protected resource, and proceed to determine, based on the authentication method specified, whether the client is authentic and/or trusted. In one embodiment, the authentication mechanism authenticates the client by extracting a set of credential information from the client's request, and comparing the set of credential information extracted with trusted credential information stored. If a match is found between the extracted set of credential information and the trusted credential information, the client is determined as authenticated.

After the client is authenticated, the authentication mechanism turns to authenticate a user. The authentication of the user can be done by invoking a user interface that is separate and distinct from the client to solicit input from a user. Based on the input solicited from the user through the user interface, the authentication mechanism determines whether the user is an authentic user of the portable computing device. If it is determined that the user is an authentic user, the authentication mechanism further determines, based on an indication from the user, whether the remote client should be authorized to access the protected resource requested. If it is determined that the remote client should be authorized to access the protected resource, the authentication mechanism allows the client to access the protected resource.

If the client is not authentic, or if the user is not an authentic user of the portable computing device, or if the user indicates that the client should not be authorized to access the protected resource, the authentication mechanism prevents the client from accessing the protected resource, for example, by not responding to the client's request.

As this discussion shows, the authentication mechanism, in accordance with an embodiment of the present invention, authenticates both client and user of the portable computing device in response to receiving a request for accessing a protected resource from the client, thereby preventing an unauthorized user from using a trusted client to access protected resources on the portable computing device.

In one embodiment, the request from the client may be in the form of an encrypted HTTP request (e.g., a HTTPS message) accompanied (or preceded) by underlying (SSL or TLS) protocol data units having a set of credential information embedded therein, which may include but is not limited to a certificate using Private Key Infrastructure (PKI). In determining whether the client is authentic, the authentication mechanism extracts the set of credential information such as the certificate from the protocol data units accompanying the HTTP request, performs cryptographic verification of a principal claimed in the certificate and determines whether the certificate is an authentic certificate associated with one of the clients that can access protected resources on the portable computing device.

In one embodiment, protected resources are classified into a plurality of protected resource groups and only one authorization is required per group per client. Upon receiving a request for a protected resource, the authentication mechanism first checks if the request is from a client that has already been authenticated. If so, the authentication mechanism skips the steps of extracting a set of credential information and determining whether the client is authentic. If it is determined that the client has been determined as authentic before, the authentication mechanism then checks if the protected resource requested belongs to a protected resource group in which another protected resource has already been successfully requested by the same client. If it is determined that the protected resource belongs to a protected resource group in which another protected resource has been successfully requested by the same client before, the authentication mechanism skips the steps of authenticating the user and determining whether the user authorizes the client for access, and proceeds to grant the client access to the protected resource.

These and other aspects of the present invention will be discussed in greater detail in the following sections.

DETAILED DESCRIPTION OF EMBODIMENT(S)

System Overview

Figure 1:
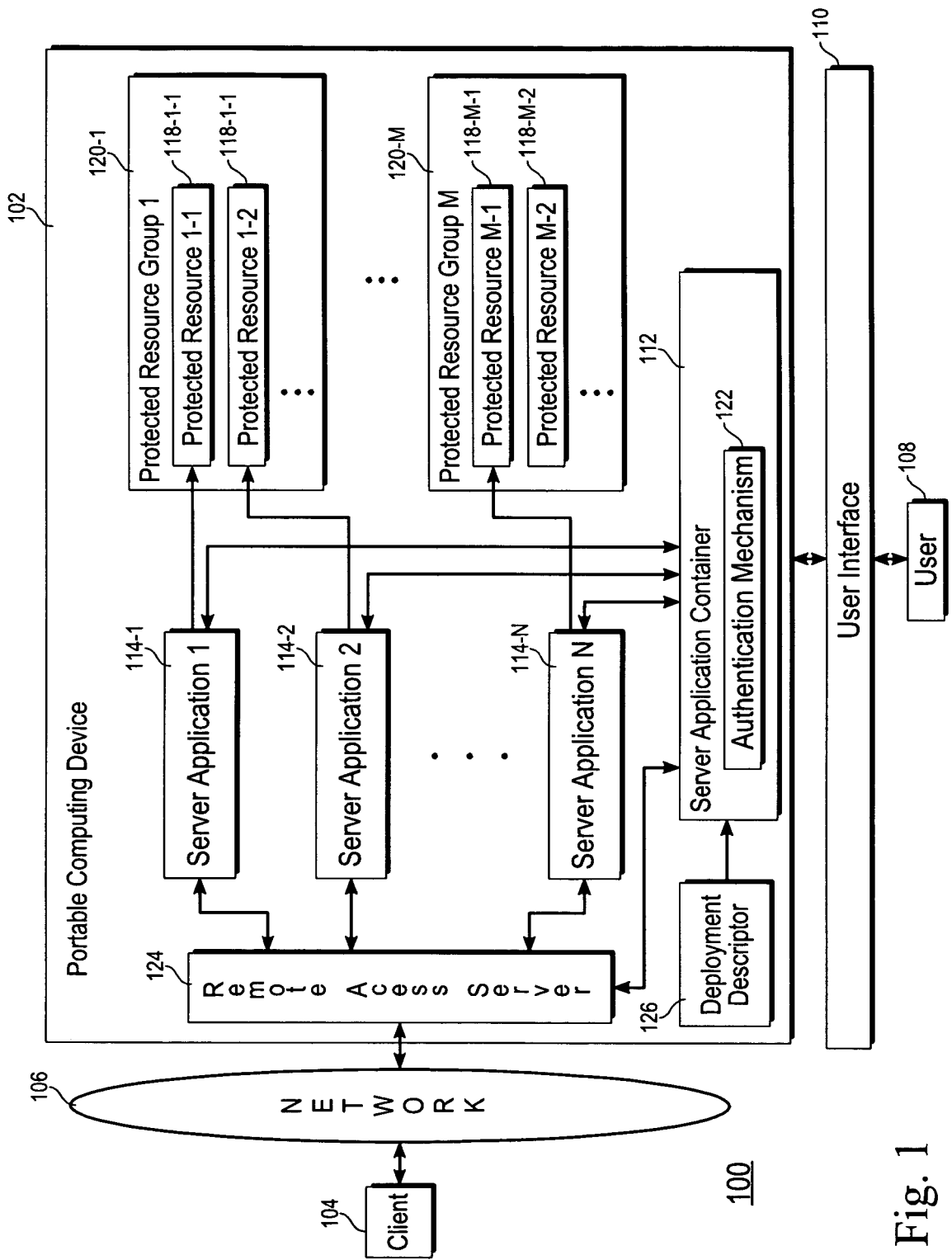
FIG. 1 is a functional block diagram of a system in which one embodiment of the present invention may be implemented.

With reference to FIG. 1, there is shown a functional block diagram of a system in which one embodiment of the present invention may be implemented. As shown, the system 100 comprises a portable computing device 102. As used herein, the term "portable computing device" refers to any computing device that is portable including but not limited to a smart card, a notebook computer, a handheld computer (e.g., a personal digital assistant), etc. The portable computing device interacts with a client 104 through a network 106 and with a user 108 through a user interface 110 that is separate and distinct from the client 104. The term "user" here refers to anyone who causes a portable computing device to connect to a network 106 and communicate with a client 104. The network 106 can be an intranet, extranet, the global internet, or a combination thereof as long as it allows the portable computing device 102 to communicate with the client 104. In one embodiment, the portable computing device 102 can plug into a local host device (not shown). An example of the local host device in the case of a smart card being the portable computing device 102 is a Card Acceptance Device (CAD) to which the smart card can be plugged. The local host device connects the portable computing device 102 to the client 104 via a bidirectional network path that comprises zero or more intermediate network nodes within the network 106.

The portable computing device 102 comprises a remote access server 124, a server application container 112 and a plurality of server applications 114 each of which controls access to one or more protected resources 118. To access a protected resource 118 (for a designated purpose such as withdrawing cash), the client 104 can communicate with a server application 114 on the portable computing device 102. This communication is mediated through the remote access server 124.

While FIG. 1 shows an embodiment where the remote access server 124, the server application container 112 and the plurality of server applications 114 as separate and distinct modules, they, in whole or in part, can be merged into a single module in some other embodiments. In one embodiment, the remote access server 124 is a web server that is capable of receiving and sending HTTP messages. For example, the client 104 can send HTTP request messages to and receive HTTP response messages from the remote access server 124; and the remote access server 124 in turn can forward the HTTP request messages from the client 104 to the server application 114, and forward the HTTP response messages from the server application 114 to the client 104. In some embodiments, this forwarding involves converting messages from a HTTP format used between the client 104 and the remote access server 124 to an internal format used between the remote access server 124 and the server application 114. In those embodiments, the forwarding also involves converting messages from an internal format used between the remote access server 124 and the server application 114 to a HTTP format used between the client 104 and the remote access server 124.

In one embodiment, lifecycles of the server applications 114 are managed by the server application container 112. For example, when a request for a protected resource 118 from a client 104 is received by the remote access server 124, the remote access server 124 invokes the server application container 112, which is either deployed within the remote access server or as a software module coupled with the remote access server, to handle the request. The server application container 112, through the authentication mechanism 122, determines which server application is associated with the protected resource and starts the server application 114. Similarly, when the request for the protected resource 118 has been completely handled by the server application 114, the server application container 112 terminates the server application 114 in one embodiment.

In another embodiment, various types of server applications 114 have been started in a pool of server applications 114 before a server application 114 receives and handles a request from a client 104. In one embodiment, this pool of server applications 114 is managed by the server application container 112, which pre-starts the server applications at a startup time of the server application container or at a time when a configuration file such as a deployment descriptor 126 is read or re-read.

In one embodiment, the plurality of server applications 114 and the server application container 112 are implemented as servlets and a servlet container respectively using Java-based web technology. In another embodiment, they are implemented as applets and an applet container respectively using Java Card technology.

In one embodiment, the protected resources 118 are grouped into a plurality of protected resource groups 116. Furthermore, each protected resource 118 may be identified by a unified resource identifier (URI) or an application identifier (AID) (e.g., smart cards).

The authentication mechanism 122 can be implemented as a contained component within the application container 112 as shown in FIG. 1, or alternatively as an application separate and distinct from the application container 112. In the embodiment where it is separate from the application container 112, the authentication mechanism 122, acting as a global authenticator, may concurrently interact with one or more containers including but not limited to the server application container 112 in a peer-to-peer fashion. As used herein, the term "container" refers to a module that handles common tasks such as lifecycle management or authentication for other modules that the container is associated with.

In one embodiment, the deployment descriptor 126 is used to associate each one of protected resources 118 with (i) a server application 114 and (ii) a client authentication method that is used to authenticate clients 104 who requests the aforementioned protected resource 118. Examples of the client authentication methods include but are not limited to HTTP-based basic authentication and digest authentication, HTTPS/SSL certificate-based authentication, and form-based authentication. In one embodiment, HTTP-based basic, digest and form-based authentication are used to authenticate a user 108 whereas HTTPS/SSL is used to authenticate clients 104.

In one embodiment, the user interface 110 can be invoked by the authentication mechanism 122 and may be hosted on a user interface device (not shown) attached to the portable computing device 102 or another computing device such as a local hosting device (not shown) to which the portable computing device 102 connects. In another embodiment, the authentication mechanism 122 can delegate the invocation of the user interface 110 to a local hosting device to which the portable computer connects. In one embodiment, a delegation request can be made by the authentication mechanism 122 by sending a user interface request message to a well-known port designated on the local hosting device. When the user interface request message is received on the well-known port, the local hosting device can create or use the user interface 110 and prompt the user 108 for input and, after receiving input from the user 108, forward any such input to the authentication mechanism 122 on the portable computing device 102. Input solicited from the user 108 may be, for example, a PIN, biometric information, or any other information that identifies the user 108.

Sample Operation

With reference to the functional block diagram of FIG. 1 and the operational flow diagram of FIG. 2, a sample operation of the system 100 will now be described. As noted, a remote access server 124 is provided on a portable computing device 102. The portable computing device 102 is connected to a network 106 such as the global internet. A client 104 of the portable computing device 102 can be located anywhere on the network 106. To access a protected resource 118 for a designated purpose, the client 104 can communicate with an associated server application 114 on the portable computing device 102. This communication is mediated through the remote access server 124 on the portable computing device 102.

As noted before, in one embodiment, a deployment descriptor 126 is used to associate each one of protected resources 118 with a server application 114 and a client authentication method that is used to authenticate clients 104 who requests the associated protected resource 118. Thus, upon receiving a request (step 210 of FIG. 2) for a protected resource 118 from a client 104, the authentication mechanism 122 in the server application container 112, based on the deployment descriptor 126, identifies the protected resource 118, determines which server application 118 is responsible for processing the request, and which authentication method is specified for authenticating clients who request the protected resource 118. The authentication mechanism 122 then authenticates the client 104 based on the authentication method specified (step 220 of FIG. 2). The authentication mechanism 122 authenticates the client 104 by extracting a set of credential information from the client's request, perform cryptographic verification of a principal claimed in the certificate and comparing the set of credential information extracted with a set of trusted credential information. As used herein, the phrase "extracting a set of credential information from the client's request" include extracting a set of credential information from any lower level protocol data units accompanying or preceding an application-level message that represents the client's request. If a match is found between the extracted set of credential information and the trusted credential information, the client 104 is determined as authenticated. In one embodiment, the trusted credential information is locally stored on the portable computing device 102 and the aforementioned extracting and determining steps are performed on the portable computing device 102. In other embodiments, trusted credential information may be stored off the portable computing device and the aforementioned extracting and determining steps may in part or in whole be performed by an authentication service provider (not shown) off the portable computing device 102, to which the authentication mechanism 122 can make requests for authenticating any particular client 104.

Upon a determination that the client 104 is authentic, the authentication mechanism 122 next determines (i) whether a user 108 is authentic and (ii) whether the user 108 wish to allow the client 104 to access the protected resource 118. The authentication mechanism 122 can invoke a user interface 110 that is separate and distinct from the client 104 to solicit input from the user 108 (step 230 of FIG. 2). Based on the input solicited from the user 108, the authentication mechanism 122 determines whether the user 108 is an authentic user of the portable computing device 102 (step 240 of FIG. 2). If it is determined that the user 108 is an authentic user, the authentication mechanism 122 determines based on an indication from the user 108, whether the client 104 should be allowed to access the protected resource 118 requested (step 250 of FIG. 2). In some embodiments, the allowance of access in favor of the client 104 may be implied by the fact that the user 108 has inputted correct credential information in response to being prompted. In any event, if it is determined that the client 104 should be authorized to access the protected resource 118, the authentication mechanism 122 allows the client 104 to access the protected resource 118 (step 260 of FIG. 2), for example, by causing the request for the protected resource 118 to be forwarded to the associated server process 114 for further handling.

Figure 2:
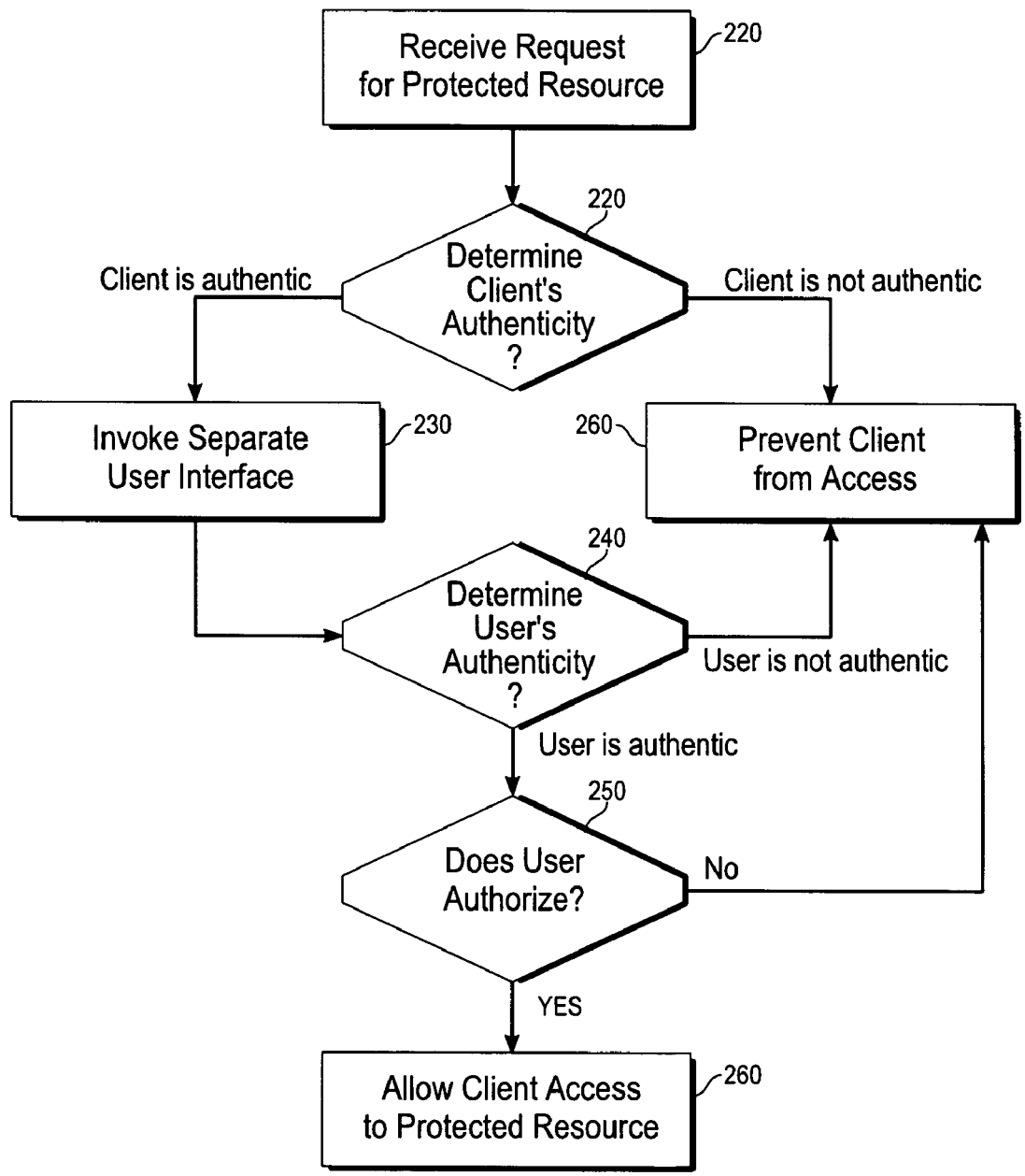
FIG. 2 is an operational flow diagram illustrating the operation of the authentication mechanism of FIG. 1, in accordance with one embodiment of the present invention.

If the client 104 is not authentic, or if the user 108 is not an authentic user of the portable computing device 102, or if the user 108 indicates that the client 104 should not be authorized to access the protected resource 118, the authentication mechanism 122 prevents the client 104 from accessing the protected resource 118, for example, by not responding to the client's request (step 260 of FIG. 2). This could be caused by, for example, the fact that the client 104 did not send the correct credential information such as an authentic certificate, failed to pass cryptographic verification of a principal claimed in the certificate, or that the user 108 presented incorrect credential information such as an incorrect PIN or a set of biometric information that did not match what was stored in a trusted credential store, or that the user indicated via the user interface 110 that the access should not be permitted.

In one embodiment, the request from the client 104 may be an encrypted HTTP request (e.g., a HTTPS message) accompanied (or preceded) by (SSL or TLS) protocol data units having a set of credential information embedded therewith, which includes but is not limited to the aforementioned certificate using PKI. In determining whether the client is authentic, the authentication mechanism 122 extracts the certificate from the request, perform cryptographic verification of a principal claimed in the certificate and determines whether the certificate is an authentic certificate associated with one of clients 104 that can access protected resources 118 on the portable computing device 102.

In one embodiment, the authentication mechanism 122 groups the protected resources 118 into a plurality of protected resource groups 120. As shown in FIG. 1, the portable computer device 102 comprises protected resource groups 120-1 and 120-M. The protected resource group 1 (120-1) comprises protected resources 118-1-1 and 118-1-2, and the protected resource group M (120-M) comprises protected resources 118-M-1 and 118-M-1. For multiple requests directed to any protected resource 118 in a protected resource group 120, only one authorization is required per group per client.

For example, suppose that a client 104 has already accessed a protected resource 118-1-1 in a protected resource group 1 120-1 associated with a server application 114-1, and now makes a new request for a protected resource 118-1-2 associated with a server application 114-2. Upon receiving the request for the protected resource 118-1-2, the authentication mechanism 122 first checks if the request is from a client 104 that has already been authenticated. If so, the authentication mechanism skips the steps of extracting a set of credential information and determining whether the client 104 is authentic. Otherwise, if the client 104 has not been authenticated before, the authentication mechanism performs the step 220 as shown in FIG. 2. In one embodiment, the authentication mechanism stores, in an accessible memory space, all or partial authentication results for accesses made by a plurality of clients (a portable computing devices may have multiple authentic clients and an unlimited number of non-authentic clients). Each authentication result comprises a result code (indicating success or failure), a set of credential information identifying a client, a protected resource 118 requested, optionally a protected resource group 120 with which the protected resource 118 is associated, and optionally a user 108 who authorized or rejected the access.

In the current example, the authentication mechanism 122 extracts a set of credential information from the request, looks in the authentication results for a match of the set of credential information extracted, determines that the client 104 has indeed been authenticated before, and thus skips the authentication step for the client 104.

Next, if it is determined that the client 104 has been determined as authentic before, the authentication mechanism 122 further determines if the protected resource 118 requested belongs to a protected resource group 120 in which another protected resource 118 has already been successfully requested by the same client. In the current example, the authentication mechanism 122 checks to see if the protected resource 118-1-2 belongs to a protected group 120 in which another protected resource 118 has been successfully requested by the client 104. This check can be done, for example, by iterating over all the authentication results each of which indicates a protected resource 118 has been successfully granted to the client 104 for access before.

If it is determined that the protected resource belongs to a protected resource group in which another protected resource has been successfully requested by the same client before, the authentication mechanism skips the steps of authenticating the user and determining whether the user authorizes the client for access. The authentication mechanism then grants the client access to the protected resource. In this example, since the client 104 has already successfully accessed the protected resource 118-1-1 in the same protected resource group 1 120-1 before, the authentication mechanism skips the authentication and authorization steps relating to a user 108, and grants the client 104 the access to the protected resource 118-1-2 requested.

In the embodiment where the authentication mechanism 122 is separate and distinct from all containers such as the server application container 112 and interacts with the containers in a peer-to-peer mode, the previously described approach of one authorization per group per client can be globally applied with respect to all the containers. Thus, if the authentication mechanism 122 has granted access to a client 104 to a protected resource 118, which is associated with an application managed by a container, in a protected resource group 120 upon a prior request, a subsequent request from the same client 104 to a new protected resource 118 in the same protected resource group 120 will be granted without re-authenticating the client or a user using the same previously described technique, even if the new protected resource 118 is associated with an application that is managed by a different container.

Hardware Overview

Figure 3:
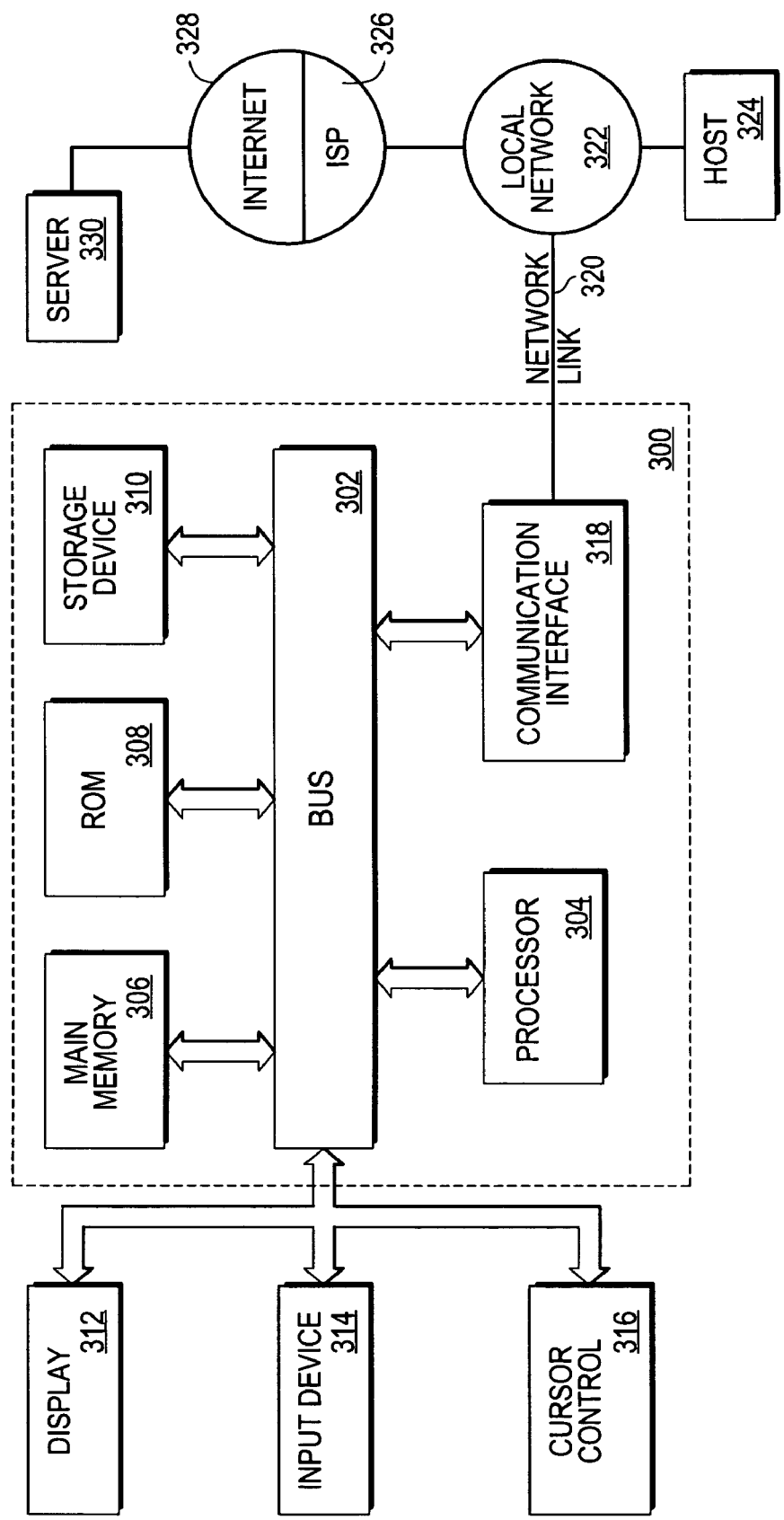
FIG. 3 is a block diagram of a general purpose computer system in which one embodiment of the present invention may be implemented.

In one embodiment, the authentication mechanism takes the form of a set of instructions that are executed by one or more processors. FIG. 3 is a block diagram of a computer system 300 upon which an embodiment of the authentication mechanism may be executed. Computer system 300 includes a bus 302 for facilitating information exchange, and one or more processors 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 may further include a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312 for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In computer system 300, bus 302 may be any mechanism and/or medium that enables information, data, etc., to be exchanged between the various components. For example, bus 302 may be a set of conductors that carries electrical signals. Bus 302 may further be a network connection that connects one or more of the components. Any mechanism and/or medium that enables information, data, etc., to be exchanged between the various components may be used as bus 302.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "non-transitory machine-readable medium" as used herein refers to any medium that participates in providing data that causes a machine to operation in a specific fashion. In an embodiment implemented using computer system 300, various non-transitory machine-readable media are involved, for example, in providing instructions to processor 304 for execution. Such a medium may take many forms, including but not limited to, non-volatile media, and volatile media. Non-volatile media includes, for example, optical or magnetic disks, such as storage device 310. Volatile media includes dynamic memory, such as main memory 306.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of non-transitory machine-readable media may be involved in carrying one or more sequences of one or more instructions to processor 304 for execution. For example, the instructions may initially be carried on a magnetic disk of a remote computer. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented.

Network link 320 typically provides data communication through one or more networks to other devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A method implemented by a portable computing device, comprising:
   receiving, by the portable computing device from a first remote client over a network, a first HTTP request to access a protected resource on the portable computing device, wherein the first HTTP request comprises a first client credential;
   making a first determination, based on the first client credential, that the first remote client can access the protected resource;
   based on the first determination:
     invoking a user interface to prompt a first user of the portable computing device to provide a first user credential, wherein the user interface is separate and distinct from the first remote client;
     obtaining the first user credential from the first user;
     making a second determination, based upon the first user credential, that the first user is an authorized user of the portable computing device;

based on the second determination:
  obtaining a confirmation from the first user that the first remote client is authorized to access the protected resource; and
  allowing the first remote client to access the protected resource based on the confirmation.

2. The method of claim 1, further comprising:
receiving, by the portable computing device from a second remote client over the network, a second HTTP request to access the protected resource on the portable computing device, wherein the second HTTP request comprises a second client credential;
making a third determination, based on the second client credential, that the second remote client cannot access the protected resource; and
based on the third determination:
  preventing the second remote client from accessing the protected resource requested.

3. The method of claim 2, wherein preventing comprises not responding to the second HTTP request from the second remote client.

4. The method of claim 1, further comprising:
receiving, by the portable computing device from a second remote client over the network, a second HTTP request to access the protected resource on the portable computing device, wherein the second HTTP request comprises a second client credential;
making a third determination, based on the second client credential, that the second remote client can access the protected resource;
based on the third determination:
  invoking the user interface to prompt a second user of the portable computing device to provide a second user credential, wherein the user interface is separate and distinct from the second remote client;
  obtaining the second user credential from the second user;
  making a fourth determination, based upon the second user credential, that the second user is not an authorized user of the portable computing device; and
based on the fourth determination:
  preventing the second remote client from accessing the protected resource requested.

5. The method of claim 1,
wherein the first HTTP request from the first remote client is an encrypted HTTP request accompanied by protocol data units carrying a certificate; and
wherein the first determination comprises extracting the certificate from the protocol data units accompanying the encrypted HTTP request and determining whether the certificate is an authentic certificate associated with one of a plurality of remote clients that can access protected resources on the portable computing device.

6. The method of claim 1,
wherein the second determination comprises verifying the first user credential with a trusted set of personal identification information.

7. The method of claim 6, wherein the set of personal identification information comprises a personal identification number that is input by the first user.

8. The method of claim 6, wherein the set of personal identification information comprises a biometric information of the first user.

9. The method of claim 1, wherein the protected resource is one of a plurality of protected resources, where a plurality of mappings maps each one of the plurality of protected resources to one of a plurality of server applications, and wherein determining that the remote client can access the protected resource comprises:
  identifying the protected resource based on the HTTP request;
  determining a first server application from the plurality of server applications for processing the HTTP request based on a first mapping from the plurality of mappings, wherein the first mapping associates the protected resource with the first server application;
  using the first server application:
    extracting the client credential from the HTTP request to obtain an extracted client credential for the remote client;
    comparing the extracted client credential with trusted credential information stored locally on the portable computing device; and
    determining that the remote client can access the protected resource when the extracted client credential matches the trusted credential information.

10. A non-transitory machine readable medium, comprising:
instructions for causing one or more processors to receive, by a portable computing device from a first remote client over a network, a first HTTP request to access the protected resource on the portable computing device, wherein the first HTTP request comprises a first client credential;
instructions for causing one or more processors to make a first determination, based on the first client credential, that the first remote client can access the protected resource;
based on the first determination:
  instructions for causing one or more processors to invoke a user interface to prompt a first user of the portable computing device to provide a first user credential, wherein the user interface is separate and distinct from the first remote client;
  instructions for causing one or more processors to obtain the first user credential from the first user;
  instructions for causing one or more processors to make a second determination, based upon the first user credential, that the first user is an authorized user of the portable computing device;
based on the second determination:
  instructions for causing one or more processors to obtain a confirmation from the first user that the first remote client is authorized to access the protected resource;
  instructions for causing one or more processors to allow the first remote client to access the protected resource based on the confirmation.

11. The non-transitory machine readable medium of claim 10, further comprising:
instructions for causing one or more processors to receive, by the portable computing device from a second remote client over the network, a second HTTP request to access the protected resource on the portable computing device, wherein the second HTTP request comprises a second client credential;
instructions for causing one or more processors to make a third determination, based on the second client credential, that the second remote client cannot access the protected resource; and
based on the third determination:
  instructions for causing one or more processors to prevent the second remote client from accessing the protected resource requested.

12. The non-transitory machine readable medium of claim 11, wherein the instructions for causing one or more processors to prevent comprise instructions for causing one or more processors to not respond to the second HTTP request from the second remote client.

13. The non-transitory machine readable medium of claim 10, further comprising:
    instructions for causing one or more processors to receive, by the portable computing device from a second remote client over the network, a second HTTP request to access the protected resource on the portable computing device, wherein the second HTTP request comprises a second client credential;
    instructions for causing one or more processors to make a third determination, based on the second client credential, that the second remote client can access the protected resource;
    based on the third determination:
        instructions for causing one or more processors to invoke the user interface to prompt a second user of the portable computing device to provide a second user credential, wherein the user interface is separate and distinct from the second remote client;
        instructions for causing one or more processors to obtain the second user credential from the second user;
        instructions for causing one or more processors to make a fourth determination, based upon the second user credential, that the second user is not an authorized user of the portable computing device; and
    based on the fourth determination:
        instructions for causing one or more processors to prevent the second remote client from accessing the protected resource requested.

14. The non-transitory machine readable medium of claim 10, wherein the first HTTP request from the first remote client is an encrypted HTTP request accompanied by protocol data units carrying a certificate; and
    wherein the instructions for causing one or more processors to make the first determination comprise instructions for causing one or more processors to extract the certificate from the protocol data units accompanying the encrypted HTTP request and determine whether the certificate is an authentic certificate associated with one of a plurality of remote clients that can access protected resources on the portable computing device.

15. The non-transitory machine readable medium of claim 10,
    wherein the instructions for causing one or more processors to make the second determination comprise instructions for causing one or more processors to verify the first user credential with a trusted set of personal identification information.

16. The non-transitory machine readable medium of claim 15, wherein the set of personal identification information comprises a personal identification number that is input by the first user.

17. The non-transitory machine readable medium of claim 15, wherein the set of personal identification information comprises biometric information of the first user.

18. An apparatus, comprising:
    one or more processors; and
    a machine readable medium comprising:
        instructions for causing one or more processors to receive, by a portable computing device from a first remote client over a network, a first HTTP request to access the protected resource on the portable computing device, wherein the first HTTP request comprises a first client credential;
        instructions for causing one or more processors to make a first determination, based on the first client credential, that the first remote client can access the protected resource;
        based on the first determination:
            instructions for causing one or more processors to invoke a user interface to prompt a first user of the portable computing device to provide a first user credential, wherein the user interface is separate and distinct from the first remote client;
            instructions for causing one or more processors to obtain the first user credential from the first user;
            instructions for causing one or more processors to make a second determination, based upon the first user credential, that the first user is an authorized user of the portable computing device;
        based on the second determination:
            instructions for causing one or more processors to obtain a confirmation from the first user that the first remote client is authorized to access the protected resource;
            instructions for causing one or more processors to allow the first remote client to access the protected resource based on the confirmation.

* * * * *